(12) United States Patent
Kobayashi et al.

(10) Patent No.: US 9,772,242 B2
(45) Date of Patent: Sep. 26, 2017

(54) PHYSICAL QUANTITY MEASURING SENSOR INCLUDING AN O-RING BETWEEN A CYLINDRICAL PORTION AND A CYLINDRICAL PROJECTION

(71) Applicant: NAGANO KEIKI CO., LTD., Tokyo (JP)

(72) Inventors: Hironori Kobayashi, Tokyo (JP); Shuji Tohyama, Tokyo (JP); Yusuke Abe, Tokyo (JP); Haruhiko Sekiya, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 148 days.

(21) Appl. No.: 14/560,818

(22) Filed: Dec. 4, 2014

(65) Prior Publication Data

US 2015/0160085 A1    Jun. 11, 2015

(30) Foreign Application Priority Data

Dec. 6, 2013 (JP) .................................. 2013-253109
Dec. 6, 2013 (JP) .................................. 2013-253110

(51) Int. Cl.
  *G01L 9/00*    (2006.01)
  *G01L 19/00*    (2006.01)
  *G01L 19/14*    (2006.01)

(52) U.S. Cl.
  CPC ........ *G01L 9/0041* (2013.01); *G01L 19/0038* (2013.01); *G01L 19/142* (2013.01); *G01L 19/147* (2013.01)

(58) Field of Classification Search
  CPC ... G01L 19/141; G01L 19/148; G01L 19/003; G01L 19/147; G01L 9/0041;
  (Continued)

(56) References Cited

U.S. PATENT DOCUMENTS 4,966,039 A    10/1990    Dell'Acqua
5,665,921 A *    9/1997    Gerst .................... G01L 9/0075
                                                              73/715

(Continued)

FOREIGN PATENT DOCUMENTS

EP        1336830        8/2003
EP        1582853        10/2005
(Continued)

OTHER PUBLICATIONS

European Search Report dated Feb. 18, 2016, 11 pages.
(Continued)

*Primary Examiner* — Lisa Caputo
*Assistant Examiner* — Brandi Hopkins
(74) *Attorney, Agent, or Firm* — Rankin, Hill & Clark LLP

(57) ABSTRACT

A physical quantity measuring sensor includes: a joint having a projection; a ceramic sensor module including a diaphragm and a cylindrical portion integrated with the diaphragm and provided to the projection; and an O-ring interposed between a sensor-module flat portion extending in a direction orthogonal to an axial direction of the cylindrical portion and a joint flat portion extending in a direction orthogonal to an axial direction of the projection.

4 Claims, 6 Drawing Sheets

(58) Field of Classification Search
CPC ............... G01L 19/142; G01L 19/0038; G01L 19/0627; G01L 27/005; G01L 9/0092; G01L 19/143; B81B 2201/0264; B81C 1/0023; Y10T 29/49103; Y10T 29/49774; Y10T 29/49927; Y10T 29/49918; Y02T 10/20; Y02T 10/47; F01N 3/021; F01N 9/002
USPC ......... 73/723, 715, 727, 721, 708, 706, 754, 73/118.1; 438/51
See application file for complete search history.

(56) References Cited

U.S. PATENT DOCUMENTS

| | | | |
|---|---|---|---|
| 5,932,808 A * | 8/1999 | Hayashi | ................ G01L 9/0075 73/718 |
| 7,073,375 B2 | 7/2006 | Parker et al. | |
| 2007/0089523 A1* | 4/2007 | Tohyama | .............. G01L 19/003 73/715 |
| 2007/0227254 A1 | 10/2007 | Nagasawa et al. | |
| 2012/0270354 A1 | 10/2012 | Hooper et al. | |

FOREIGN PATENT DOCUMENTS

| | | |
|---|---|---|
| JP | 2002-310826 | 10/2002 |
| JP | 2006-78379 | 3/2006 |
| JP | 4828804 | 9/2011 |

OTHER PUBLICATIONS

Japanese Office Action with English Translation dated Apr. 26, 2016, 2 pages.
European Search Report dated May 13, 2015, 6 pages.
U.S. Office Action dated Jul. 25, 2017, U.S. Appl. No. 15/641,807, 14 pages.

* cited by examiner

PHYSICAL QUANTITY MEASURING SENSOR INCLUDING AN O-RING BETWEEN A CYLINDRICAL PORTION AND A CYLINDRICAL PROJECTION

The entire disclosure of Japanese Patent Applications No. 2013-253109 and No. 2013-253110 filed Dec. 6, 2013 is expressly incorporated by reference herein.

TECHNICAL FIELD

The present invention relates to a physical quantity measuring sensor that measures physical quantities, such as a pressure sensor that measures pressure of a target fluid, and a sensor module.

BACKGROUND ART

The physical quantity measuring sensor is exemplified by a pressure sensor including a sensor module that is provided in a joint, the sensor module including a detection portion that detects the pressure of the target fluid.

Some of the sensor module of the pressure sensor are ceramic. A typical ceramic sensor module includes: a plate-shaped diaphragm body; an annular supporting portion connected to the diaphragm body; a recess at the center of a first surface of the diaphragm body; a step formed between an inner surface of the recess and the first surface; and a connecting portion between the first surface of the diaphragm body and an inner surface of the annular supporting portion, in which a cross section from the connecting portion and the step is curved (Patent Literature 1: Japanese Patent No. 4828804).

In order to prevent leakage of the target fluid, it is desirable that the sensor module is integrally bonded to the projection of the joint. If both the sensor module and the joint are metallic, the sensor module and the joint can be integrally bonded to each other by welding. However, when the sensor module is ceramic, the sensor module cannot be welded to the metallic joint.

When the sensor module cannot be bonded to the joint, the target fluid leaks from between the sensor module and the joint. Accordingly, an O-ring is used for attaching the sensor module to the joint.

In a typical structure in which the sensor module is attached to the joint using the O-ring, the O-ring is disposed between an inner wall of a cavity of a ceramic pressure-sensitive element and a cylindrical projection of a housing, and a washer is crimped to be fixed to a tip end of the cylindrical projection, thereby preventing the O-ring from slipping off (Patent Literature 2: JP-A-2006-78379).

In Patent Literature 2, a groove in which the O-ring is held is defined by a step, which is formed at a base end of the cylindrical projection and with which the O-ring is engaged, and the washer crimped at the tip end of the cylindrical projection.

Moreover, this pressure sensor includes a connector provided with a terminal and a housing provided with the sensor module, in which a signal detected at the sensor module is transmitted to the terminal through an electronic component.

This pressure sensor is exemplified by a typical pressure sensor including: a diaphragm member having a detection portion; a flexible circuit board having a first end connected to the detection portion; an amplifier circuit provided by circuit components and mounted at a second end of the flexible circuit board; and a connector attached with the second end of the flexible circuit board at which the circuit components are mounted (Patent Literature 3: JP-A-2002-310826).

A typical pressure sensor in a different type includes: a sensitive-pressure element; an output terminal; a flexible circuit board connecting the sensitive-pressure element to the output terminal; an ASIC mounted on the flexible circuit board; and a connector connected to an end of the output terminal (Patent Literature 2).

In the typical example of Patent Literature 1, although stress generating at the connecting portion between the diaphragm body and the annular support is reduced, a structure for attaching the ceramic sensor module to the metallic joint is not disclosed.

In the typical example of Patent Literature 1, in order to attach the sensor module to the joint using the O-ring, it is conceivable to form a projection on the joint and attach the sensor module to the projection via the O-ring. However, in such a structure, a cross-sectionally square C-shaped groove for holding the O-ring needs to be separately machined to the projection, so that the manufacturing cost of the pressure sensor is increased.

In other words, the groove for holding the O-ring needs to have a depth and a width corresponding to the dimension of the O-ring. When the width of the groove is narrower than the O-ring, the O-ring cannot be fitted into the groove. On the other hand, when the width of the groove is wider, the width of the projection from the groove to a tip end is decreased, whereby the tip end of the projection is likely to be broken or the like. Such breakage or the like of the tip end of the projection is prevented by keeping a position of the groove apart from the tip end of the projection. However, the projection itself is lengthened, and consequently, the physical quantity measuring sensor itself is also lengthened.

In the typical example of Patent Literature 2, the structure of crimping to fix the washer at the tip end of the cylindrical projection is applied for holding the O-ring to the cylindrical projection of the housing. In the typical example of Patent Literature 2, the structure of the cross-sectionally square C-shaped groove for holding the O-ring becomes complicated, thereby increasing the manufacturing cost of the pressure sensor.

Moreover, in the typical examples of Patent Literatures 2 and 3, the structure of attaching the electronic component to the flexible circuit board is applied for electrically connecting the circuit component and the electronic component of the ASIC to the sensor module. For this reason, in these typical examples, attachment of the electronic component to the flexible circuit board and assembly of the pressure sensor become complicated, thereby increasing the manufacturing cost of the pressure sensor.

In other words, since the flexible circuit board is easily bent, the flexible circuit board needs to be fixed to a holder or the like so as to attach the electronic component to a planar surface of the board, so that an operation is complicated. Further, in assembly of the pressure sensor, a first end of the flexible circuit board needs to be connected to the sensor module while a second end of flexible circuit board needs to be connected to the terminal. During this connection operation, the electronic component bonded to the flexible circuit board needs to be kept from slipping off from the flexible circuit board.

SUMMARY OF THE INVENTION

An object of the invention is to provide a physical quantity measuring sensor capable of holding an O-ring in a simple structure, a sensor module that is easily connectable to an electronic component, and the physical quantity measuring sensor provided with the sensor module.

According to an aspect of the invention, a physical quantity measuring sensor includes: a joint having a cylindrical projection in which an introduction hole for introducing a target fluid is formed; a ceramic sensor module disposed on a downstream side of the projection in a flow direction of the target fluid, the ceramic sensor module comprising: a diaphragm to be displaced depending on a pressure of the introduced target fluid; and a cylindrical portion integrated with the diaphragm and provided to the projection; and an O-ring interposed between the cylindrical portion and the projection, in which the O-ring is interposed between a sensor-module flat portion extending in a direction orthogonal to an axial direction of the cylindrical portion and a joint flat portion extending in a direction orthogonal to an axial direction of the projection.

According to the above aspect of the invention, for instance, ceramic powders are formed into a compact in a die and the compact is sintered to manufacture the sensor module. Herein, a step for forming the sensor-module flat portion is preferably formed in advance in the die. The joint flat portion is formed by grinding the projection of the joint. The O-ring is locked at the joint flat portion formed to the projection. The sensor module is attached to the joint such that an outer circumferential surface of the projection faces the inner circumferential surface of the cylindrical portion. In this state, the sensor-module flat portion and the joint flat portion function in a pair as a cross-sectionally square C-shaped groove for restricting the displacement of the O-ring in the axial direction of the projection.

Accordingly, it is not required to form a cross-sectionally C-shaped groove only on the joint in order to place the O-ring, thereby simplifying the structure for holding the O-ring. In other words, it is only required to form the joint flat portion near the tip end of the projection. Accordingly, grooving is easy compared with formation of a square C-shaped groove on the projection. Consequently, a manufacturing cost of the physical quantity measuring sensor is reducible. A length of the projection from the joint flat portion to the tip end is only required to be at least equal to the thickness of the O-ring (a dimension along the axial direction). Accordingly, the physical quantity measuring sensor can be downsized by shortening a length of the joint itself.

It is preferable that an inclined surface for preventing the projection from interfering with an inner circumferential edge of the sensor-module flat portion is formed at an end of the projection.

With this arrangement, since the inclined surface prevents interference between the sensor module and the projection, the projection of the joint can be easily attached to the cylindrical portion of the sensor module. Further, when the O-ring is attached to the projection, the inclined surface functions as a guide, so that the O-ring is easily attachable.

In the above aspect of the invention, it is preferable that the sensor-module flat portion is in parallel to a top flat surface of the diaphragm.

With this arrangement, by positioning the sensor module such that the top flat surface forms a predetermined angle (e.g., 90 degrees) relative to the axial direction of the projection, the sensor-module flat portion is also positioned in the same direction.

Thus, since the positioning of the sensor-module flat portion can be conducted using the top flat surface of the diaphragm, the O-ring can be prevented from slipping off from the projection.

It is preferable that the joint includes a retaining member for preventing the sensor module from slipping off from the projection.

With this arrangement, even when the ceramic sensor module cannot be welded to the joint, the retaining member prevents the projection from slipping off from the sensor module.

For this reason, even when the physical quantity measuring sensor vibrates during delivery and after setting up, the sensor module is not displaced relative to the joint, so that an accurate measurement can be conducted.

In another aspect of the invention, a ceramic sensor module includes: a diaphragm having a displacement portion to be displaced depending on a pressure of a target fluid to be introduced; and a cylindrical portion integrated with the diaphragm, in which an electronic component is disposed on a planar surface of the diaphragm opposite to a surface of the diaphragm where the target fluid comes into contact, and the electronic component includes: a component body disposed away from a surface corresponding to the displacement portion of the planar surface; and a lead frame having a base end connected to the component body and a tip end bonded to a part other than the surface corresponding to the displacement portion on the planar surface of the diaphragm.

In the above aspect of the invention, the tip end of the lead frame of the electronic component is disposed at a part other than the surface corresponding to the displacement portion on the planar surface of the diaphragm while the component body is away from the displacement portion. For this reason, even when the target fluid is introduced to displace the displacement portion, such a displacement is not disturbed, so that an appropriate measurement of the physical quantity can be conducted.

In the above aspect of the invention, since the sensor module is a hard ceramic member, the electronic component can be directly attached to the sensor module. Accordingly, it is not required to attach the electronic component to the flexible circuit board that is easily bent. For this reason, the electronic component can be easily electrically connected to the sensor module.

In the above aspect of the invention, the electronic component is preferably an ASIC.

With this arrangement, since the ASIC is an essential electronic component and is larger than other electronic components, the ASIC is suitably provided to the sensor module.

According to a still another aspect of the invention, a physical quantity measuring sensor includes: a joint having a cylindrical projection in which an introduction hole for introducing a target fluid is formed; the sensor module according to the aspect of the invention disposed on a downstream side of the projection of the joint in a flow direction of the target fluid; and a flexible circuit board having a first end electrically connected to the sensor module and a second end electrically connected to a terminal, in which the flexible circuit board has an end connected to a part other than the surface corresponding to the displacement portion on the planar surface of the diaphragm.

In the above aspect of the invention, since the electronic component can be directly attached to the sensor module, it is not required to attach the electronic component to the flexible circuit board that is easily bent.

Accordingly, the electronic component can be easily attached to the sensor module. Further, since the electronic component is not attached to the flexible circuit board, the electronic component does not hamper connection of the flexible circuit board to the sensor module and the terminal, so that the physical quantity measuring sensor can be easily assembled.

In the above aspect of the invention, it is preferable that the terminal is provided to a connector connected to the joint, a lid is provided to the connector, and the flexible circuit board is inserted in the lid.

With this arrangement, after the resin mold is provided in order to avoid displacement of the connection portion between the terminal and the flexible circuit board, the lid shields dropping of the resin mold. Accordingly, the resin mold can be prevented from adhering on the electronic component and the sensor module.

Consequently, decrease in measurement accuracy of the physical quantity measuring sensor can be prevented.

BRIEF DESCRIPTION OF THE DRAWING(S)

DESCRIPTION OF EMBODIMENT(S)

Exemplary embodiment(s) of the invention will be described with reference to the attached drawings.

Figure 1:
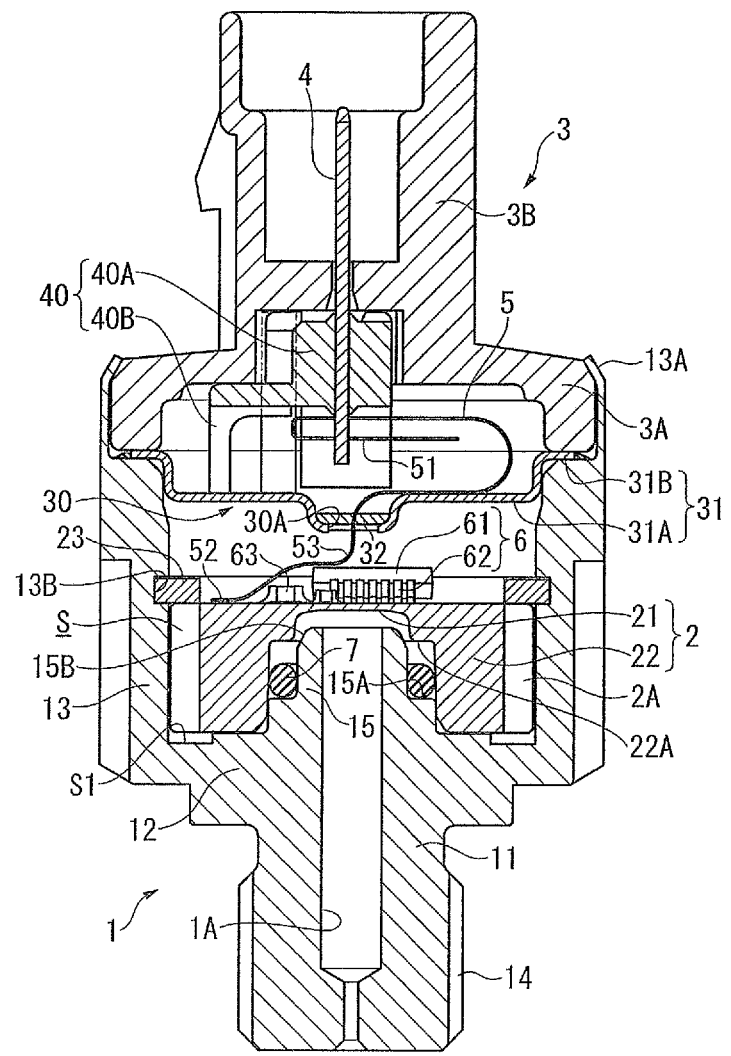
FIG. 1 is a cross-sectional view showing a physical quantity measuring sensor according to an exemplary embodiment of the invention.

FIG. 1 shows an overall structure of a physical quantity measuring sensor in an exemplary embodiment.

In FIG. 1, a physical quantity measuring sensor is a pressure sensor including: a joint 1; a sensor module 2 provided to the joint 1; a connector 3 that covers the sensor module 2; a terminal 4 provided to the connector 3; a flexible circuit board 5 that electrically connects the terminal 4 to the sensor module 2; an electronic component 6 provided to the sensor module 2.

The joint 1 is a metallic member and includes a shaft 11 in which an introduction hole 1A for introducing the target fluid is formed; a flange 12 that radially extends from a center of the shaft 11; and a sleeve 13 integrally formed on a periphery of the flange 12.

One end of the shaft 11 is defined as a screw 14 to be screwed into an attachment portion (not shown). The other end of the shaft 11 is defined as a projection 15 to which the sensor module 2 is provided.

In the middle of the projection 15, a step is formed such that a diameter of a tip end of the projection 15 is smaller than that of a base end thereof. A planar surface of the step is defined as a joint flat portion 15A that is a planar surface orthogonal to an axial direction of the projection 15 and radially extends.

Figure 2:
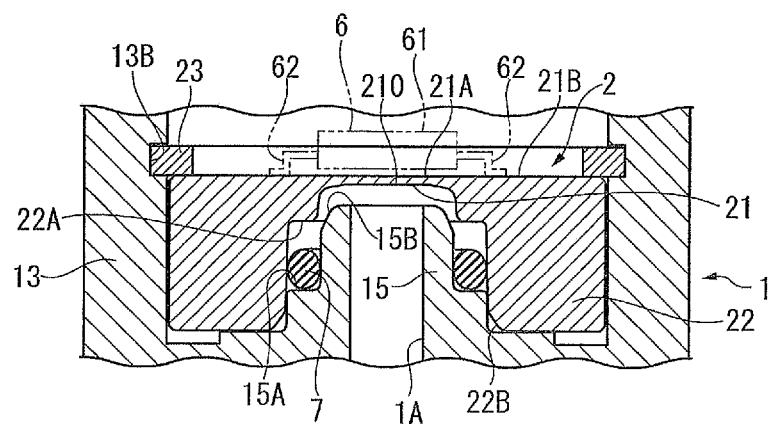
FIG. 2 is a cross-sectional view showing a relevant part of the physical quantity measuring sensor.
Figure 3:
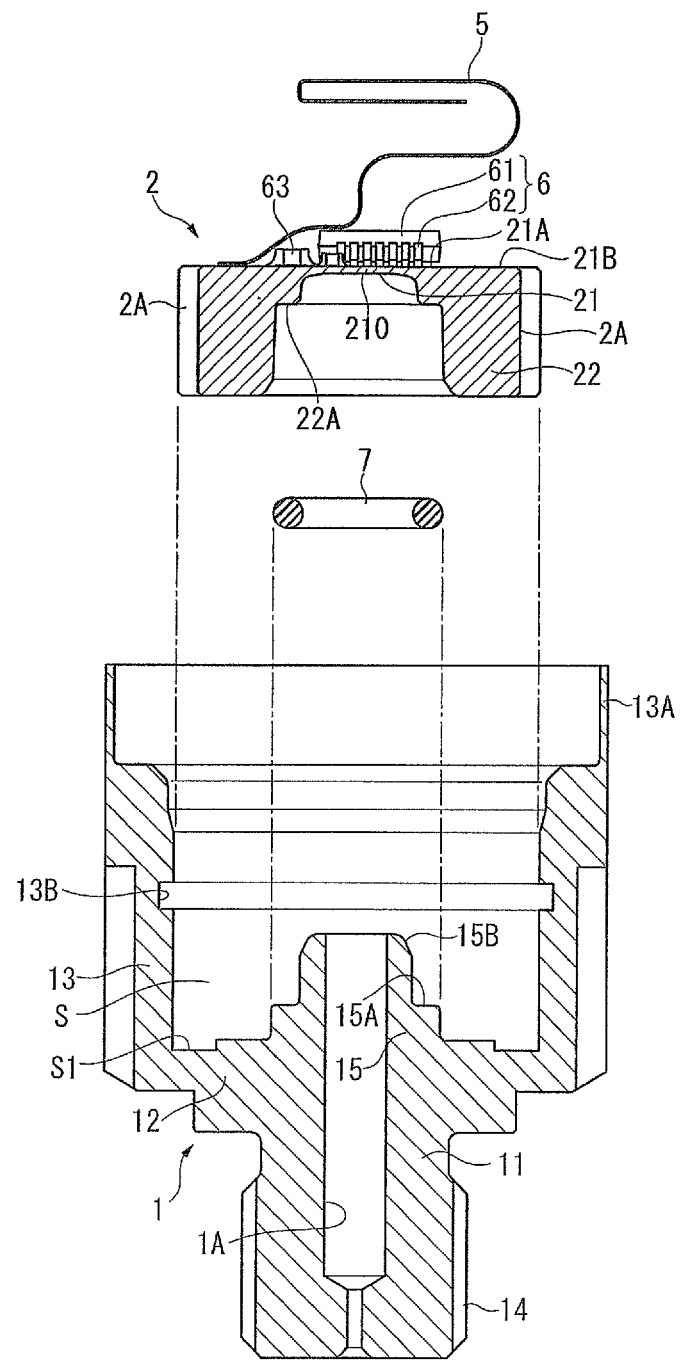
FIG. 3 is an exploded cross-sectional view showing the relevant part of the physical quantity measuring sensor.

On the tip end of the projection 15, an inclined surface 15B having a diameter decreasing toward the tip end is formed (see FIGS. 2 and 3).

A space S divided by the flange 12, the projection 15 and the sleeve 13 is provided for housing the sensor module 2. The space S is communicated with a recess S1 formed in a planar ring having a predetermined width on a peripheral planar surface of the flange 12. The recess S1 is formed so as to properly locate corners of the sensor module 2. A planar surface of the recess S1 is away from a bottom of the sensor module 2.

A planar shape of the space S for housing the sensor module 2 is circular and a planar shape of the sensor module 2 is substantially circular. A diameter of the space S is approximately equal to a diameter of the sensor module 2.

An open end of the sleeve 13 is defined as a locking portion 13A that locks the connector 3.

The connector 3 is a synthetic resin-made component and includes an annular base 3A held by the locking portion 13A and a body 3B that is integrated with the base 3A and supports the terminal 4.

The base 3A is closed with a lid 30.

The lid 30 includes a metallic lid body 31 having an opening 30A at a center of the lid 30 and an insulative holding plate 32 provided over the opening 30A of the lid body 31.

The lid body 31 includes a plate portion 31A and a peripheral portion 31B provided on a peripheral edge of the plate portion 31A. The peripheral portion 31B is sandwiched between the sleeve 13 and the base 3A of the connector 3.

The holding plate 32 is a synthetic resin-made plate and has a holding hole for holding the flexible circuit board 5.

A resin mold (not shown) is provided in a space divided by the base 3A of the connector 3 and the lid 30 in order to avoid disconnection of the terminal 4 from the flexible circuit board 5 and to secure waterproof performance.

The terminal 4 is provided in a synthetic resin-made attachment member 40 by insert molding. Although only a single terminal 4 is shown in FIG. 1, three terminals 4 are disposed in a paper penetration direction in FIG. 1 in the exemplary embodiment.

The attachment member 40 includes a body 40A that holds the terminal 4 and a leg 40B integrated with the body 40A. The body 40A is attached to the base 3A.

An end of the terminal 4 is exposed from the body 40A of the attachment member 40. An end of the flexible circuit board 5 is connected to the exposed end of the terminal 4. The end of the flexible circuit board 5 is connected to the terminal 4 in a folded manner so that force is not likely to be applied to the connection portion with the terminal 4 even when the end of the flexible circuit board 5 swings.

FIGS. 2 to 5 each show a specific structure of the sensor module 2.

Figure 4A:
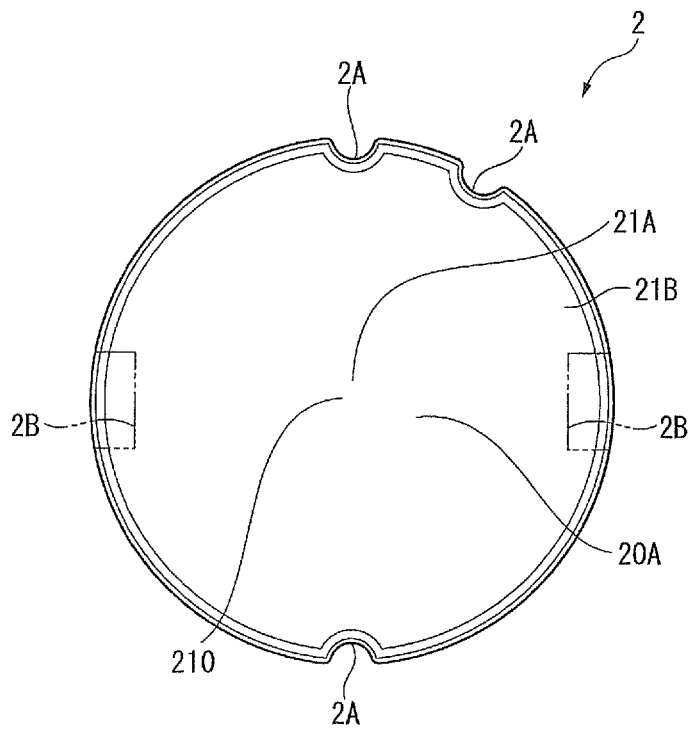
FIG. 4A is a plan view of a sensor module.
Figure 4B:
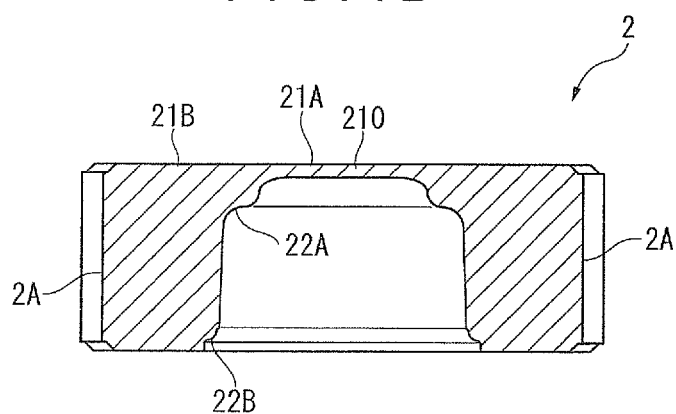
FIG. 4B is a cross-sectional view of the sensor module.

FIGS. 2 and 3 each show a cross section of a relevant part of the physical quantity measuring sensor. FIG. 4 shows the sensor module 2.

In FIGS. 2 to 4, the sensor module 2 is disposed on a downstream side of a flow direction of the target fluid relative to the projection 15 of the joint 1.

The sensor module 2, which is ceramic, includes: a diaphragm 21 provided close to an end of the projection 15 of the joint 1 on the downstream side in the flow direction of the target fluid; and a cylindrical portion 22 that is integrated with the diaphragm 21 and is attached to the projection 15.

The joint 1 includes a retaining member 23 for preventing the sensor module 2 from dropping off from the projection.

The retaining member 23 is a cross-sectionally rectangular spring ring that is fitted in a fitting cavity 13B circumferentially formed on an inner circumferential surface of the sleeve 13. This spring ring is a C-shaped spring member in a plan view. An outer circumferential portion of the spring ring is fitted in the fitting cavity 13B while a part of an inner circumferential portion thereof presses a peripheral edge of the diaphragm 21.

A surface opposite to a surface of the diaphragm 21 facing the projection 15 is defined as a top flat surface 20A.

A central portion of the diaphragm 21 is defined as a displacement portion 210 to be displaced by pressure of the target fluid. The target fluid is introduced through the introduction hole 1A of the joint 1 into a space defined by a bottom of the displacement portion 210 and an inner circumferential surface of the cylindrical portion 22. The target fluid to be measured in the exemplary embodiment encompasses liquid (e.g., water) and gas (e.g., air).

The bottom of the displacement portion 210 to come into contact with the target fluid is formed corresponding to a shape of a head of the projection 15. For instance, the bottom of the displacement portion 210 may be flat, or may be curved so that the displacement portion 210 becomes thinner toward the center thereof.

A detection portion (not shown) including a strain gauge and the like is provided at a planar central part 21A corresponding to the displacement portion 210 of the top flat surface 20A.

An inner circumferential portion of the cylindrical portion 22 located close to the diaphragm 21 is defined as a sensor-module flat portion 22A.

The sensor-module flat portion 22A is a planar surface orthogonal to an axial direction of the cylindrical portion 22 and extending in a radial direction. The sensor-module flat portion 22A has a diameter larger than that of the displacement portion 210 and is in parallel to the top flat surface 20A of the sensor module 2.

The inner circumferential portion of the cylindrical portion 22 near the opening end is fitted to an outer circumferential portion of the projection 15 in a predetermined depth from the opening end. An inclined portion 22B is formed from an edge of the fitted part to the opening end.

The inclined portion 22B may be flat or curved.

An O-ring 7 is located between the cylindrical portion 22 of the sensor module 2 and the projection 15 of the joint 1.

The O-ring 7 is disposed in a space between the sensor-module flat portion 22A and the joint flat portion 15A. The sensor-module flat portion 22A and the joint flat portion 15A restrict displacement of the O-ring 7 in an axial direction of the projection 15 and are in parallel with each other in a state of the sensor module 2 being attached to the projection 15.

A width of each of the sensor-module flat portion 22A and the joint flat portion 15A in a radial direction of the cylindrical portion 22 is equal to or slightly smaller than a thickness of the O-ring 7 so that the O-ring 7 is held between the projection 15 and the cylindrical portion 22.

It is only required that an axial dimension of the projection 15 from the joint flat portion 15A to the inclined surface 15B is at least the same as the thickness of the O-ring 7.

An inner circumferential edge of the sensor-module flat portion 22A is kept free from interference with the projection 15 due to the inclined surface 15B.

It is only required that an axial dimension of the cylindrical portion 22 from the sensor-module flat portion 22A to the inclined portion 22B is at least the same as the thickness of the O-ring 7.

On an outer circumferential portion of the sensor module 2, three outer grooves 2A are provided in parallel with the axial direction of the cylindrical portion 22.

The outer grooves 2A are used for positioning the sensor module 2 by a positioning device (not shown) when a detector and the like are pattern-printed on the top flat surface 20A of the sensor module 2.

In order to accurately position the sensor module 2, the three outer grooves 2A are arranged at non-equal intervals. Specifically, two of the outer grooves 2A are opposite to each other across an axis core of the sensor module 2 and the last one of the outer grooves 2A is arranged at a position near one of the above two outer grooves 2A. It should be noted that, in the exemplary embodiment, in order to position the sensor module 2, the outer grooves 2A may be replaced by recesses 2B that are formed opposite to each other across the axis core of the sensor module 2.

Figure 5A:
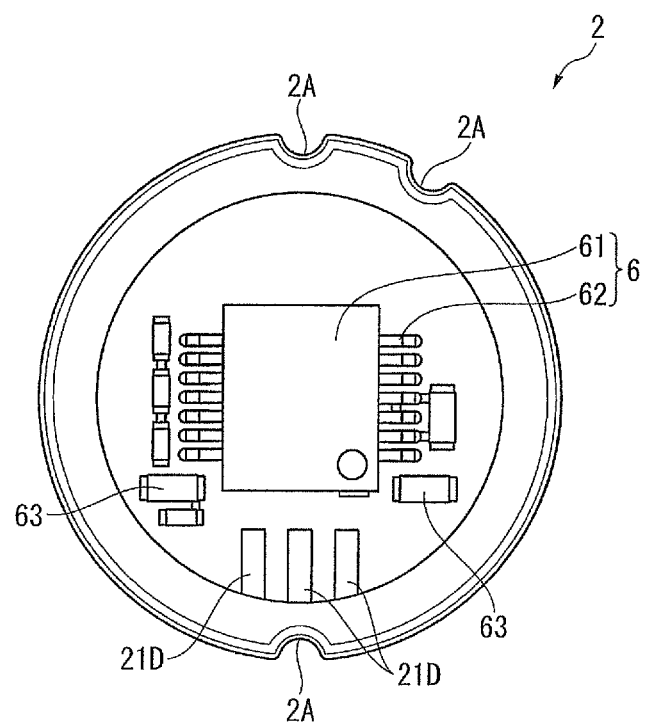
FIG. 5A is a plan view of the sensor module to which electronic components are attached.
Figure 5B:
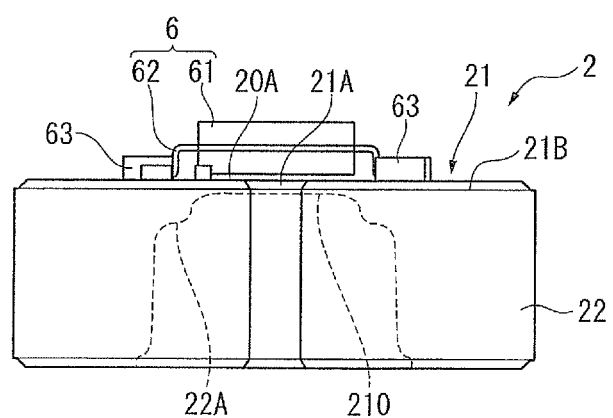
FIG. 5B is a side view of the sensor module to which the electronic components are attached.

FIG. 5 shows the electronic component 6 being attached to the sensor module 2.

In FIG. 5, the electronic component 6 in the exemplary embodiment is an ASIC (Application Specific Integrated Circuit) used for adjustment or the like of a measurement value.

The electronic component 6 is disposed on a (planar) surface of the diaphragm 21 opposite to a surface thereof where the target fluid comes into contact.

The electronic component 6 includes a plate-shaped component body 61 and a plurality of lead frames 62 each having a base end connected to the component body 61.

The component body 61 is disposed away from the planar central part 21A of the diaphragm 21.

A tip end of each of the lead frames 62 is bonded to a planar outer circumferential portion 21B located on a periphery of the planar central part 21A of the top flat surface 20A of the diaphragm 21. The tip end of each of the lead frames 62 is bonded to the planar outer circumferential portion 21B with a conductive adhesive agent and the like.

A plurality of circuit elements 63 are bonded to the planar outer circumferential portion 21B. The circuit elements 63 and the lead frames 62 are connected to a planar circuit (not shown) formed on the planar outer circumferential portion 21B. The planar circuit is connected to a detection portion (not shown) provided in the displacement portion 210 and to three pads 21D.

Figure 6:
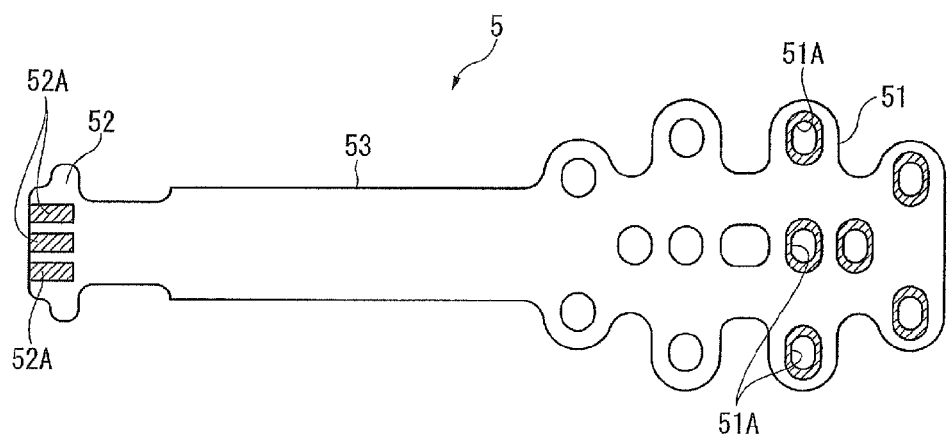
FIG. 6 is a development view of a flexible circuit board.

FIG. 6 shows a detailed structure of the flexible circuit board 5. FIG. 6 is a development view of the flexible circuit board 5.

As shown in FIGS. 1 and 6, the flexible circuit board 5 includes: a first end 51 connected to the terminal 4; a second end 52 connected to the diaphragm 21; and a middle portion 53 that is interposed between the second end 52 and the first end 51 and is held by the holding plate 32.

The first end 51 has an engaging hole 51A in which the terminal 4 is engaged. In the exemplary embodiment, the engaging hole 51A and the terminal 4 are soldered to each other.

The second end 52 is fixed to the diaphragm 21 by thermocompression bonding. The second end 52 has three terminals 52A to be soldered to the pads 21D (see FIG. 5) of the planar circuit.

The terminals 52A are electrically connected to the engaging hole 51A in a circuit pattern (not shown).

In order to assemble the physical quantity measuring sensor having the above structure, firstly, the sensor module 2 is made of ceramics.

Various methods are applicable to the manufacture of the sensor module 2. For instance, ceramic powders are filled in a die (not shown) to form a compact and the compact is sintered. In this method, a step for defining the sensor-module flat portion and the like is provided in advance in the die. With this arrangement, the sensor-module flat portion 22A is to be formed as a part of the compact.

The compact is put into a furnace (not shown), sintered at a predetermined temperature, and subsequently taken out of the furnace.

The planar circuit and the detection portion are formed on the diaphragm 21 of the sensor module 2 thus manufactured. The electronic component 6 and the circuit elements 63 are attached to the diaphragm 21. The second end 52 of the flexible circuit board 5 is bonded to the diaphragm 21.

Further, a metallic block is ground or the like to form the joint 1. At this time, at the same time when the joint 1 is processed, the joint flat portion 15A is formed on the projection 15. Other components for the physical quantity measuring sensor are manufactured.

Subsequently, the O-ring 7 is attached to the outer circumferential portion of the projection 15 of the joint 1. The sensor module 2 to which the flexible circuit board 5, the electronic component 6, and other requisite members are attached is attached to the projection 15 (see FIG. 3). With this arrangement, the O-ring 7 is interposed between the sensor-module flat portion 22A of the sensor module 2 and the joint flat portion 15A of the projection 15.

Further, the retaining member 23 is attached to the joint 1 to prevent the sensor module 2 from slipping off.

The middle portion 53 of the flexible circuit board 5 is held by the holding plate 32 located at the center of the lid 30. The terminal 4 in advance provided to the attachment member 40 by insert molding is bonded to the first end 51 of the flexible circuit board 5.

Further, after the terminal 4 is attached to the connector 3, the connector 3 is locked in the sleeve 13 of the joint 1.

According to the exemplary embodiment, following advantages can be obtained.

(1) The physical quantity measuring sensor includes: the joint 1 having the projection 15; the ceramic sensor module 2 including the diaphragm 21 and the cylindrical portion 22 integrated with the diaphragm 21 and attached to the projection 15; and the O-ring 7 interposed between the sensor-module flat portion 22A extending in a direction orthogonal to the axial direction of the cylindrical portion 22 and the joint flat portion 15A extending in a direction orthogonal to the axial direction of the projection 15. It is not required to form a cross-sectionally square C-shaped groove only on the joint 1 in order to place the O-ring 7, thereby simplifying the structure for holding the O-ring 7. Since the length of the projection 15 from the joint flat portion 15A to the tip end and the length of the sensor module 2 from the sensor-module flat portion 22A to the opening end can be set short, the physical quantity measuring sensor can be down-sized by shortening the length of the projection 15 and the sensor module 2 in the axial direction.

(2) The sensor module 2 includes the diaphragm 21 having the displacement portion 210 and the cylindrical portion 22 integrated with the diaphragm 21. The electronic component 6 is disposed on the planar surface of the diaphragm 21. The electronic component 6 includes: the component body 61 disposed away from the planar central part 21A corresponding to the displacement portion 210 of the planar surface of the diaphragm 21; and the lead frames 62 each having the base end connected to the component body 61 and having the tip end bonded to the planar outer circumferential portion 21B other than the planar central part 21A. Since the tip end of each of the lead frames 62 of the electronic component 6 is located on the planar surface away from the displacement portion 210, an appropriate measurement is possible without disturbing the displacement of the displacement portion 210. Since the sensor module 2 is a hard ceramic member, by directly attaching the electronic component 6 to the sensor module 2, it is not required to attach the electronic component 6 to the flexible circuit board 5 that is easily bent. Accordingly, the electronic component 6 can be easily electrically connected to the sensor module 2.

(3) Since the sensor-module flat portion 22A is formed in parallel to the top flat surface 20A of the diaphragm 21, by positioning the top flat surface 20A of the sensor module 2 so as to be at a right angle relative to the axial direction of the projection 15, the sensor-module flat portion 22A is also positioned in the same direction. Accordingly, the O-ring 7 does not slip off from the projection 15.

(4) Since the inclined surface 15B is formed at the tip end of the projection 15, when the projection 15 of the joint 1 is attached to the cylindrical portion 22 of the sensor module 2, the inner circumferential edge of the sensor-module flat portion 22A is unlikely to interfere with the projection 15. Accordingly, the sensor module 2 can be easily attached to the projection 15.

(5) Since the retaining member 23 for preventing the sensor module 2 from slipping off from the projection 15 is provided to the joint 1, the sensor module 2 is not tilted relative to the joint 1 even when the physical quantity measuring sensor vibrates during delivery and after setting up, so that an accurate measurement is possible.

(6) Since the retaining member 23 is the spring ring fitted in the fitting cavity 13B of the sleeve 13, the retaining member 23 can be easily attached to the joint 1.

(7) Since the planar shape of the space S for housing the sensor module 2 of the joint 1 is in conformity with the planar shape of the sensor module 2, a peripheral surface of the sensor module 2 housed in the space S of the joint 1 comes into contact with an inner circumferential surface of the sleeve 13. Accordingly, since the sensor module 2 is not tilted relative to the projection 15, an accurate measurement is also possible in view of this point.

(8) Since the joint 1 includes the sleeve 13 for locking the connector 3, a casing for connecting the joint 1 to the connector 3 is not necessary, thereby decreasing the number of the components, so that the physical quantity measuring sensor can be efficiently assembled.

(9) Since the outer grooves 2A are formed on the outer circumferential portion of the sensor module 2, the sensor module 2 can be accurately positioned when the detection portion and the like are pattern-printed on the top flat surface 20A of the sensor module 2. Accordingly, since the detection portion and the like are accurately formed on the sensor module 2, an accuracy of the physical quantity measuring sensor can be enhanced.

(10) The electronic component 6 is disposed on the planar surface of the diaphragm 21. The electronic component 6 includes: the component body 61 disposed away from the planar central part 21A corresponding to the displacement portion 210; and the lead frames 62 each having the base end connected to the component body 61 and the tip end bonded to the planar outer circumferential portion 21B away from the displacement portion 210. Since the tip end of each of the lead frames 62 of the electronic component 6 is located away from the displacement portion 210, an appropriate measurement is possible without disturbing the displacement of the displacement portion 210. Since the sensor module 2 is a hard ceramic member, by directly attaching the electronic component 6 to the sensor module 2, it is not required to attach the electronic component 6 to the flexible circuit board 5 that is easily bent. Accordingly, the electronic component 6 can be easily electrically connected to the sensor module 2.

(11) The physical quantity measuring sensor includes the sensor module 2 in which the electronic component 6 is attached to the diaphragm 21; and the flexible circuit board 5 in which the first end 51 is connected to the terminal 4 and the second end 52 is electrically connected to the sensor module 2. The second end 52 of the flexible circuit board 5 is connected to the planar outer circumferential portion 21B located on the planar surface of the diaphragm 21 and away from the displacement portion 210. With this arrangement, since it is not required to attach the electronic component 6 to the flexible circuit board 5 that is easily bent, the electronic component 6 can be easily attached to the flexible circuit board 5. Further, since the electronic component 6 is not attached to the flexible circuit board 5, the electronic component 6 does not hamper connection of the flexible circuit board 5 to the sensor module 2 and the terminal 4.

(12) Since the ASIC (the electronic component 6) is an important electronic component in the physical quantity measuring sensor and a larger component than other electronic components, it is preferable to set the ASIC in the sensor module 2.

(13) Since the terminal 4 is provided to the connector 3, the lid 30 is provided to the connector 3, and the flexible circuit board 5 is inserted in the lid 30, the resin mold is provided in order to avoid displacement of the connecting portion between the terminal 4 and the flexible circuit board 5 and to secure waterproof performance, so that the resin mold is blocked by the lid 30. Accordingly, since the resin mold does not adhere on the electronic component 6 and the sensor module 2, deterioration in the measurement accuracy is preventable.

The invention is not limited to the exemplary embodiments described above, but includes modifications and improvements as long as an object of the invention can be achieved.

The electronic component 6 is directly disposed on the planar surface of the diaphragm 21 in the above exemplary embodiment. However, in the invention, the board may be disposed away from the planar surface of the diaphragm 21 and the electronic component 6 may be attached to the board. Moreover, the electronic component 6 directly set in the diaphragm 21 is in a form of the ASIC. However, in the invention, the electronic component 6 may be a capacitor, an amplifier circuit and other elements as long as those have a lead frame.

Moreover, in the above exemplary embodiment, the lid 30 is provided to the connector 3 and the flexible circuit board 5 is inserted into the lid 30. However, in the invention, the lid 30 may be omitted.

In the above exemplary embodiment, in order to restrict the displacement of the O-ring 7 in the axial direction of the projection 15, the sensor-module flat portion 22A is formed extending in the direction orthogonal to the axial direction of the cylindrical portion 22 and the joint flat portion 15A is formed extending in the direction orthogonal to the axial direction of the projection 15. However, in the invention, as long as the displacement of the O-ring 7 can be restricted, the angles at which the sensor-module flat portion 22A and the joint flat portion 15A are formed may not be limited to the directions orthogonal to the respective axial directions of the cylindrical portion 22 and the projection 15, but it is only required that the sensor-module flat portion 22A and the joint flat portion 15A intersect with the respective axial directions of the cylindrical portion 22 and the projection 15. Alternatively, other arrangements may be applied for restricting the displacement of the O-ring 7 in the axial direction of the projection 15. For instance, a groove for holding the O-ring 7 may be formed in the projection 15.

Further, a processing method of the ceramic sensor module 2 and the joint 1 is not limited to the method described in the exemplary embodiment. For instance, the compact, which is to be the base material of the sensor module 2, may be molded in the die or the like and be cut or ground to provide the sensor module 2 including the sensor-module flat portion 22A.

Moreover, in the invention, as the retaining member 23 for preventing the sensor module 2 from slipping off from the joint 1, the spring ring may be replaced by a plurality of locking pins provided on the inner circumferential surface of the joint 1.

Although being exemplified by the pressure sensor in the above exemplary embodiment, the physical quantity measuring sensor of the invention is also applicable to, for instance, a differential pressure sensor and a temperature sensor.

Moreover, although the joint 1 is formed of the metallic member in the above exemplary embodiment, the joint may be formed of a synthetic resin member in the invention.

The invention claimed is:

1. A physical quantity measuring sensor comprising:
  a joint having a cylindrical projection in which an introduction hole for introducing a target fluid is formed;
  a ceramic sensor module disposed on a downstream side of the projection in a flow direction of the target fluid, the ceramic sensor module comprising: a diaphragm to be displaced depending on a pressure of the introduced target fluid; and a cylindrical portion integrated with the diaphragm, an inner circumferential portion of the cylindrical portion being fitted to an outer circumferential portion of the projection; and
  an O-ring interposed between the cylindrical portion and the projection, wherein
  the O-ring is interposed between a sensor-module flat portion extending in a direction orthogonal to an axial direction of the cylindrical portion and a joint flat portion extending in a direction orthogonal to an axial direction of the projection,
  the joint comprises a retaining member for preventing the sensor module from slipping off from the projection, and
  the retaining member comprises a ring fitted to a fitting cavity formed on an inner circumferential surface of the joint along a circumferential direction.

2. The physical quantity measuring sensor according to claim 1, wherein
  an inclined surface for preventing the projection from interfering with an inner circumferential edge of the sensor-module flat portion is formed at an end of the projection.

3. The physical quantity measuring sensor according to claim 1, wherein
  the sensor-module flat portion is in parallel to a top flat surface of the diaphragm.

4. The physical quantity measuring sensor according to claim 1, wherein the O-ring is in direct contact with the inner circumferential portion of the cylindrical portion and the outer circumferential portion of the projection.

\* \* \* \* \*